United States Patent
Qiu et al.

(10) Patent No.: US 12,013,320 B1
(45) Date of Patent: Jun. 18, 2024

(54) EMBEDDING ASSEMBLY FOR TISSUE DEHYDRATION AND LOCATION

(71) Applicant: Hangzhou HealthSky Biotechnology Co., Ltd., Zhejiang (CN)

(72) Inventors: Yanxi Qiu, Zhejiang (CN); Lixin Mao, Zhejiang (CN); Gang Cheng, Zhejiang (CN)

(73) Assignee: Hangzhou HealthSky Biotechnology Co., Ltd., Zhejiang (CN)

( * ) Notice: Subject to any disclaimer, the term of this patent is extended or adjusted under 35 U.S.C. 154(b) by 0 days.

(21) Appl. No.: 18/236,457

(22) Filed: Aug. 22, 2023

(51) Int. Cl.
*G01N 1/36* (2006.01)
(52) U.S. Cl.
CPC ...................................... *G01N 1/36* (2013.01)
(58) Field of Classification Search
None
See application file for complete search history.

(56) References Cited

U.S. PATENT DOCUMENTS

| 7,488,603 | B2 * | 2/2009 | Gjerde | B01J 20/285 436/66 |
| 2005/0019950 | A1 * | 1/2005 | Gierde | B01J 20/285 436/180 |
| 2006/0131226 | A1 * | 6/2006 | Tseng | B01D 69/061 422/400 |
| 2019/0170626 | A1 * | 6/2019 | Kravtsov | A01N 1/0242 |

\* cited by examiner

*Primary Examiner* — Brian R Gordon
(74) *Attorney, Agent, or Firm* — Cooper Legal Group, LLC

(57) ABSTRACT

The present application relates to the technical field of a processing technology of a biological tissue sample, and particularly to an embedding assembly for tissue dehydration and location and an using method thereof. In particular, the embedding assembly for tissue dehydration and location includes a sample container, a reagent container and an embedding support, the sample container is placed in the reagent container, and the embedding support is placed in the reagent container and positioned above the sample container. The embedding assembly for tissue dehydration and location also includes a flexible locating component positioned between the embedding support and the sample container. The locating component includes a locating strip, which configured to face a bottom of the sample container after assembling the embedding assembly for tissue dehydration and location.

4 Claims, 5 Drawing Sheets

EMBEDDING ASSEMBLY FOR TISSUE DEHYDRATION AND LOCATION

CROSS-REFERENCE TO RELATED APPLICATION

The present application is based on and claims the priority benefits of China application No. 202310435907.X, filed on Apr. 19, 2023. The entirety of China application No. 202310435907.X is hereby incorporated by reference herein and made a part of this specification.

TECHNICAL FIELD

The present application relates to the technical field of pre-processing of pathological analysis, and particularly to an embedding assembly for tissue dehydration and location.

BACKGROUND ART

In general, a dehydration embedding assembly is composed of a sample container, a reagent container and an embedding support, in which the sample container is placed in the reagent container and used for containing a biological tissue sample, and the embedding support is placed in the sample container, with a gap provided therebetween.

The dehydration embedding assembly is consumable material, generally manufactured by batches. However, in order to be applied to the biological tissue sample as much as possible and prevent a deformation of the biological tissue sample due to pressing during an embedding process, there is a large gap between the embedding support and the sample container in general.

However, a lightweight or thin biological tissue sample will float or overturn by varied degrees with a continuous rising liquid level of a reagent or a liquid paraffin during a process of adding the reagent or the liquid paraffin into an assembled dehydration embedding assembly. In particular, when the biological tissue sample is overturned, curled or straightened, the biological tissue sample tends to be placed in an inappropriate position or state. After the liquid paraffin is cooled to be formed, the biological tissue sample still remain the inappropriate position or state, thereby finally affecting the following operation such as sectioning, observation, and the like.

SUMMARY

In order to solve problems such as overturning, curling or straightening, and the like during embedding a biological tissue sample, the present application provides an embedding assembly for tissue dehydration and location and an using method thereof.

In a first aspect, the present application provides an embedding assembly for tissue dehydration and location, including the following technical solution:

the embedding assembly for tissue dehydration and location includes a sample container, a reagent container and an embedding support, wherein the sample container is placed in the reagent container, and the embedding support is placed in the reagent container and positioned above the sample container. The embedding assembly for tissue dehydration and location also includes a locating component with a flexible texture positioned between the embedding support and the sample container. The locating component includes a locating strip, which is configured to face a bottom of the sample container after assembling the embedding assembly for tissue dehydration and location.

In the present application, the biological tissue sample is stabilized by the locating component provided between the embedding support and the sample container. The locating component is soft and has a certain toughness, which not only locates the biological tissue sample, but also avoids damaging the biological tissue sample, so as not to affect a slicing effect.

A number of the locating strip is not limited, and may be one, two or above. A shape of the locating strip is not limited, which can be of such a shape as column, platform, and the like. A length of the locating strip is not limited. If the locating strip has a relatively long length, since the locating strip is flexible, it can achieve a bendable effect and locate and block the biological tissue sample, while not damaging a state of the biological tissue sample. If the locating strip has a relatively short length that enables preventing the biological tissue sample from overturning, curling or straightening when being placed between the embedding support and the sample container, the possibility of floating or overturning thereof can be reduced after adding the reagent or the liquid paraffin.

A first end of the locating strip is configured to face a bottom of the sample container and contacts the biological tissue sample, and a second end thereof abuts against or is fixed with the embedding support. This produces certain locating and blocking effects for the biological tissue sample, provides the added reagent or liquid paraffin with good contacting and embedding effects for the biological tissue sample, and further facilitates improving an accuracy of observation when slicing the sample subsequently.

In an embodiment, the locating strip is fixed at a bottom of the embedding support.

The above technical solution facilitates improving operation convenience, since the locating strip is simultaneously placed in the sample container to contact the biological tissue sample when the embedding support is placed in the reagent container.

In an embodiment, the locating component further includes a carrier fixedly connected to the locating strip.

The overall stability of the locating component can be improved by fixedly connecting the carrier with the locating strip to form a whole structure. In addition, the whole structure can be used independent from the embedding support or fixedly connecting with the embedding support, both of which can have a good locating effect for the biological tissue sample.

In an embodiment, the carrier is fixedly connected to the bottom of the embedding support.

The above technical solution facilitates further improving the operation convenience.

In an embodiment, the carrier has at least one shape selected from a group consisting of strip, frame and sheet with a through-hole.

The shape of the carrier is not limited, for example, a shape of a strip, a frame or a sheet with the through-hole. In addition, it can be any shapes in addition to the above shapes, as long as a through-hole in the embedding support is not covered.

In an embodiment, a length of the locating strip is not greater than a distance between the bottom of the embedding support and that of the sample container when the embedding support is placed in the sample container. A plurality of locating strips have gradually decreased lengths from outside to inside to form a concave locating area.

In the above technical solution, the locating strip has a proper length, which has an overall limiting effect for the biological tissue sample from up to down, without unduly abutting against the biological tissue sample, so that the biological tissue sample can retain its original state to facilitate improving the accuracy of detection when slicing the sample. In addition, the locating area gradually concaved towards the center facilitates containing the tissue sample while locating the same firmly.

In an embodiment, a distance between adjacent locating strips is 0.3-1.5 mm; and preferably, the distance between the adjacent locating strips is 0.3 mm.

A center distance between the adjacent locating strips is not less than 0.5 mm; and preferably, the center distance between the adjacent locating strips is 0.8 mm.

In the above technical solution, a gap is formed between adjacent locating strips by providing the distance therebetween. In addition, limiting a thickness of the locating strip can save materials. The gap formed between the locating strips and a relatively small contact area between the locating strips and the tissue sample can fully contact the tissue sample with the reagent during addition of the reagent to achieve a good dehydration, and further achieve a good observation after slicing, avoiding influencing the observation due to excessive contact between the locating strips and the tissue sample.

In an embodiment, a material of the locating strip is a flexible material. The flexible material is at least one selected from a group consisting of liquid silicone, flexible plastic and latex. The locating strip has a Shore hardness of 5-60 HA.

The flexible material adopted in the present application can be a material having a Shore hardness of 5-60 HA, such as liquid silicone, flexible plastic, latex, and the like, as long as the Shore hardness is within above Shore hardness range. The flexible material is soft and has a certain toughness, therefore, it has better locating and blocking effects for the biological tissue sample, which reduces possibility of overturning, curving and the like, and avoiding damage to the biological tissue sample. If the Shore hardness is greater than 60 HA, a part of the biological tissue sample is prone to damage during an operation. Therefore, it will be proper to control the Shore hardness of the flexible material adopted by the locating component at 5-60 HA. The flexible material adopted in the present application includes but not limited to the above materials.

In an embodiment, a preparation method of the locating component includes the following steps:
injecting a melted flexible material into a mould of the locating component, cooling for solidification, and removing the mould of the locating component to obtain the locating component; and
the mould of the locating component is connected to the bottom of the embedding support.

In the present application, the melted flexible material is injected into the mould of the locating component to be formed, so as to obtain the locating component with various shapes. In particular, the locating component, the embedding support and the sample container are detached from each other, that is, the locating component can only include the locating strip. After the mould of the locating component is fixedly connected to the bottom of the embedding support, the melted flexible material is injected into the mould to be formed, in this way, the cooled locating component obtained can connect with the embedding support. Therefore, the embedding assembly for tissue dehydration and location is assembled more conveniently, and it can provide a better locating effect for the biological tissue sample. In addition, the locating component can also include the carrier and the locating strip.

In a second aspect, the present application provides an using method for the embedding assembly for tissue dehydration and location, adopting the following technical solution:

the using method for the embedding assembly for tissue dehydration and location includes the following steps:
step one, placing the sample container in the reagent container, placing the biological tissue sample at the bottom of the sample container, placing the locating component on the biological tissue sample, and placing the embedding support on the reagent container and above the sample container;
step two, injecting the reagent until the reagent immerses the bottom of the embedding support, then taking the reagent out of a liquid tank of the reagent container and repeating the above operation;
step three, injecting liquid paraffin until the liquid paraffin immerses the bottom of the embedding support, cooling for solidification, and then taking out the embedding support to obtain a biological tissue sample embedded on the embedding support; and
in the step one, placing the sample container in the reagent container, placing the biological tissue sample at the bottom of the sample container, and then placing the embedding support fixed with the locating component on the reagent container and above the sample container.

When the locating component is detached from the embedding support, the locating component needs to be placed on the biological tissue sample at first, then the embedding support is placed on the reagent container, while a first end of the locating component contacts the bottom of the embedding support and a second end thereof contacts the biological tissue sample. It can obtain locating and blocking effect for the biological tissue sample during a process of injecting the reagent.

However, when the locating component is fixedly connected to the embedding support, the embedding support fixed with the locating component is fixedly connected in the reagent container and above the sample container, so that an end of the locating component departing from the embedding support contacts the biological tissue sample, so as to generate the locating and blocking effects.

In summary, the present application can achieve at least the following beneficial effects.

1. The biological tissue sample placed in the sample container can be located from up to down by a cooperation between the locating strip with the flexible texture and the embedding support. The biological tissue sample is not prone to phenomena such as floating, overturning, curving, and the like by the addition of the reagent or liquid paraffin. Therefore, the embedded biological tissue sample is in a relatively smooth and proper state, so as to achieve smooth subsequent slicing and accurate observation.

2. The locating strip is a flexible material, such as liquid silicone, and the like, and has a Shore hardness within a proper range. Therefore, it will cause no damage to the biological tissue sample, and will not hinder the slicing of the embedded biological tissue sample in a later stage, facilitating smooth slicing.

DETAILED DESCRIPTION

Examples

Figure 1:
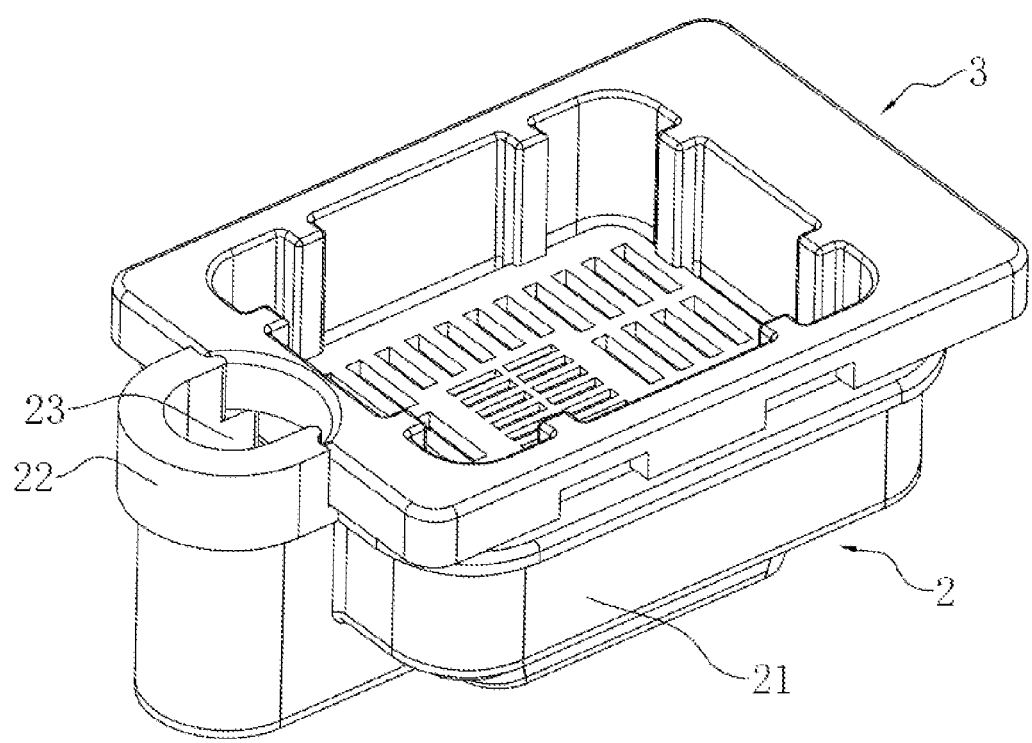
FIG. 1 is a schematic structural view of an embedding assembly for tissue dehydration and location in Example 1.
Figure 2:
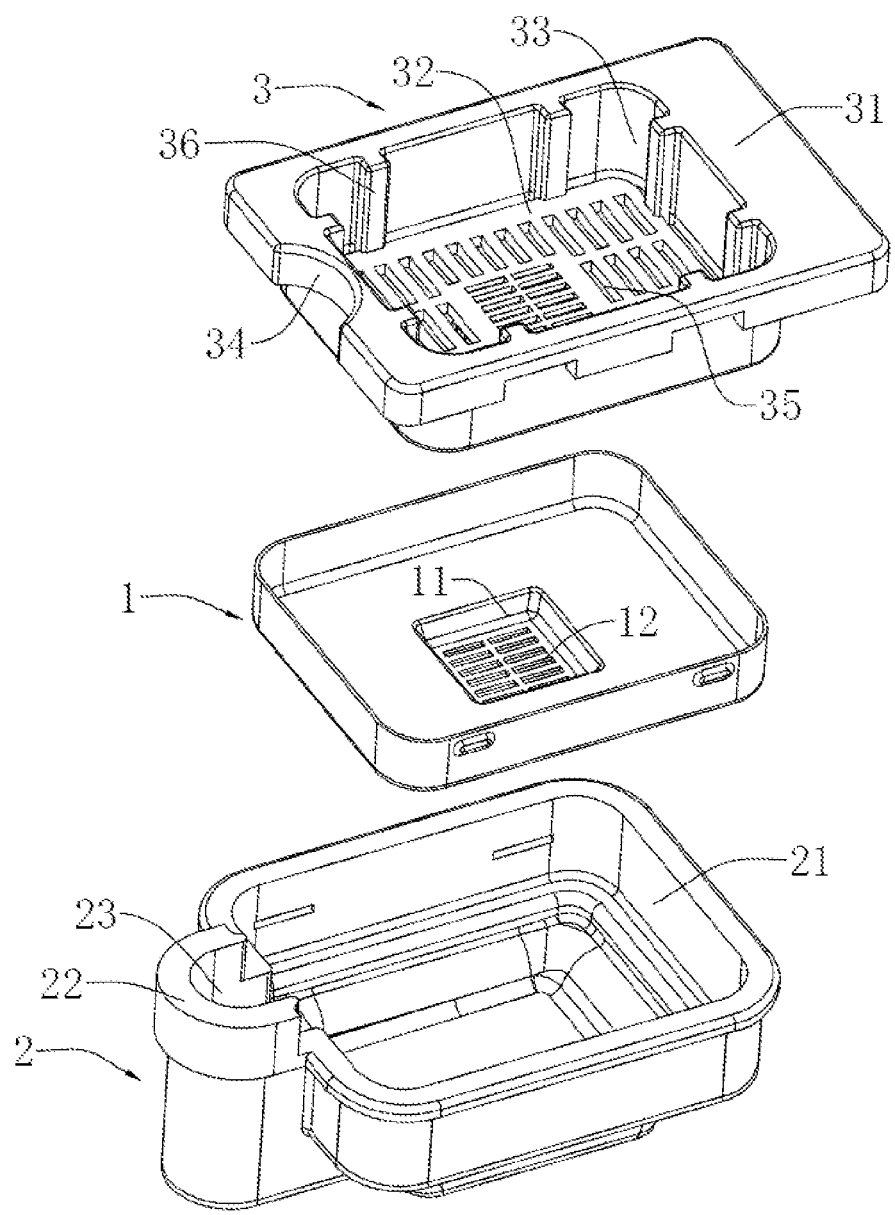
FIG. 2 is an explosion view of an embedding assembly for tissue dehydration and location in Example 1.

Example 1: an embedding assembly for tissue dehydration and location, referring to FIGS. 1-2, includes a sample container 1, a reagent container 2 and an embedding support 3, the sample container 1 is fixedly connected to the reagent container 2, the embedding support 3 is placed in the reagent container 2, above the sample container 1.

In particular, as shown in FIG. 2, the reagent container 2 includes a box body 21 and an extension end 22 integrally formed with the box body 21, and the extension end 22 is formed with a liquid tank 23 in communication with the box body 21.

A placement area 11 for placing the biological tissue sample protrudes outwards from a center of a bottom of the sample container 1, which is defined with a plurality of through-holes 12, for example, twelve through-holes 12. During adding a reagent, the reagent is leaked into the reagent container 2 through the through-holes 12, or, alternatively, the reagent as added can gradually rise through the through-holes 12 to immerse the biological tissue sample, so that the reagent fully contacts the biological tissue sample.

The embedding support 3 includes a frame 31 and a support board 32, and the frame 31 and the support board 32 are connected with each other by a connection board 33. One side of the frame 31 is defined with an arc-shape notch 34, and the support board 32 is formed with a plurality of strip-shaped embedding holes 35. After the sample container 1, the reagent container 2 and the embedding support 3 are assembled, the arc-shaped notch 34 is positioned right above the liquid tank 23.

Figure 3:
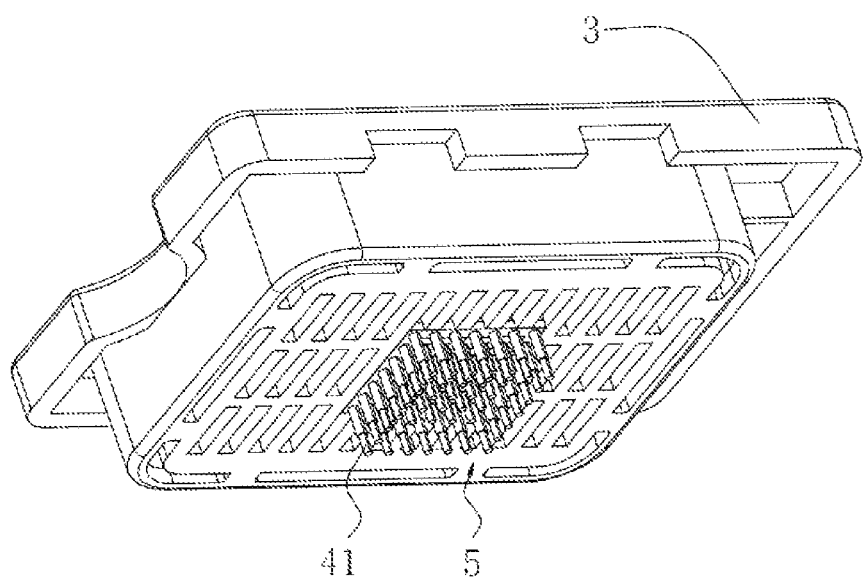
FIG. 3 is a schematic structural view of an embedding support in Example 1.
Figure 4:
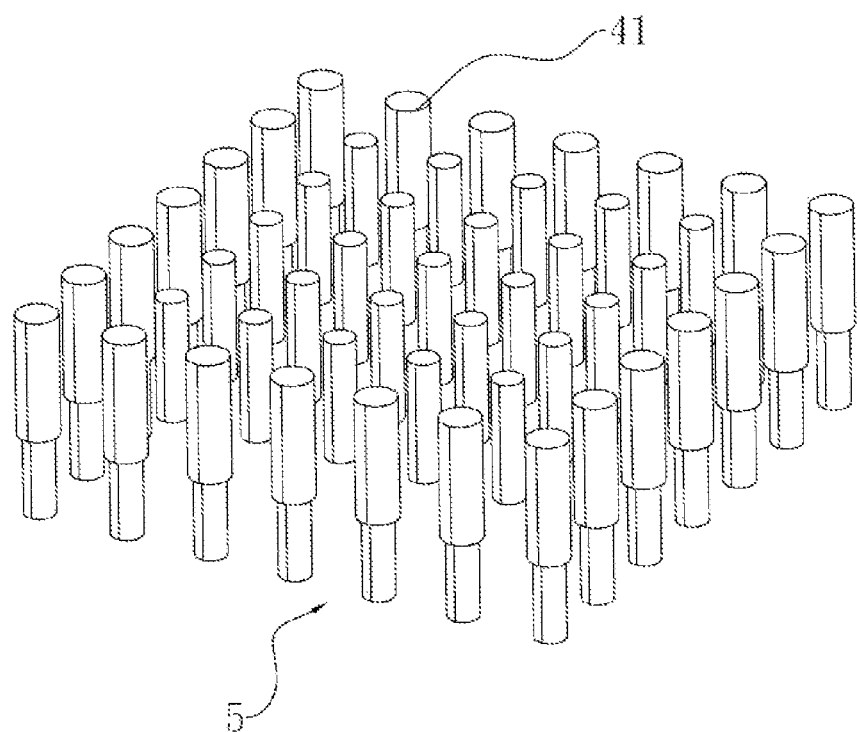
FIG. 4 is a schematic structural view of a locating strip in Example 1.

As shown in FIG. 3, a bottom of the embedding support 3 is fixedly connected with a plurality of columnar locating strips 41. A fixing way of the locating strip 41 is as follows:

a mould is fixed at a bottom of the support board 32 of the embedding support 3, then a melted flexible material is injected into the mould, cooled and formed, and the mould is removed, so that a center of the support board 32 is formed with a locating area 5 composed of a plurality of columnar locating strips 41 with a same length, referring to FIGS. 2-3. Referring to FIG. 4, outer locating strips 41 have two sections with different thicknesses, in which a diameter of a first section thereof connected to the embedding support 3 is greater than that of a second section away from the embedding support 3, and inner locating strips 41 have a same diameter as that of the second section away from the embedding support 3, and a same length as that of the first section connected to the embedding support 3. From outside to inside, the lengths of the plurality of locating strips 41 gradually decrease, so that the locating area 5 thus formed has a concave shape from outside to inner side. A distance between adjacent locating strips 41 is 0.3 mm at the second section away from the embedding support 3. The center distance between the adjacent locating strips 41 is 0.8 mm and same as the placement area 11. The formed locating strips 41 is flexible.

An operation during a using process for the embedding assembly for tissue dehydration and location is as follows:

step one, placing the sample container 1 in the reagent container 2 so that an outer wall of the sample container 1 abuts against an inner wall of the reagent container 2, placing the biological tissue sample at the placement area 11 of the sample container 1, and then placing the embedding support 3 fixed with the locating strip 41 on the reagent container 2, so that the frame 31 is provided at an upper edge of the reagent container 2, the arc-shaped notch 34 is positioned right above the liquid tank 23, and the locating strip 41 is positioned right above the placement area 11, in which the length of the locating strip 41 is equal to the distance between the support board 32 and the bottom of the sample container 1;

step two, injecting the reagent until the reagent immerses the bottom of the embedding support 3, then taking the reagent out of the liquid tank 23 of the reagent container 2 and repeating the above operation until complete dehydration of the biological tissue sample; and step three, injecting liquid paraffin until the liquid paraffin immerses the bottom of the embedding support 3, cooling for solidification, and then taking out the embedding support 3 to obtain an embedded biological tissue sample on the embedding support 3.

The reagent container 2 and the embedding support 3 in this example are plastic, and the sample container 1 is stainless steel, so as to facilitate separating the liquid paraffin block after cooling and solidifying from the sample container 1 together with the embedding support 3. The flexible material in this example is Polyurethane E255.

The locating strip 41 has a thick section and a thin section, the thin section contacts the biological tissue sample by a small contact area. There are different gaps between adjacent locating strips 41. Therefore, when the reagent or liquid paraffin is injected into the gaps, they facilitate immersing biological tissue sample, and more fully dehydrating or embedding the biological tissue sample, improving an accuracy of subsequent detection.

Figure 5:
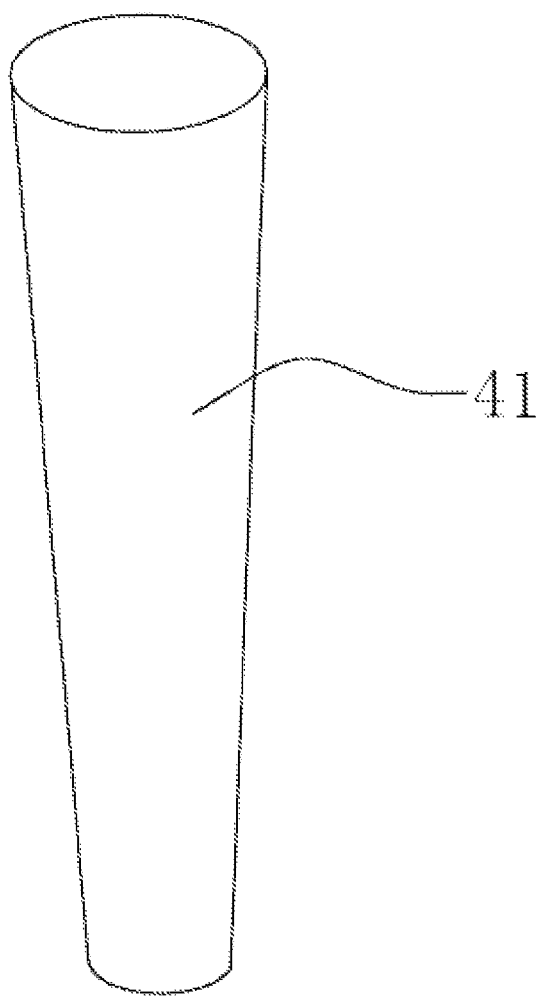
FIG. 5 is a schematic structural view of a locating strip in Example 2.

Example 2: an embedding assembly for tissue dehydration and location is provided, differing from Example 1 in that: as shown in FIG. 5, the locating component 4 is one locating strip 41 with a thick end and a thin end, assuming a trapezoid shape as a whole. During assembling the embedding assembly for tissue dehydration and location, the locating strip 41 is not fixed to the embedding support 3, the thin end of the locating strip 41 contacts the biological tissue sample, and the thick end contacts the bottom of the embedding support 3. The locating strip 41 is obtained by an injection molding.

In this way, the locating strip 41 is easy to be prepared. Comparing with Example 1, the locating strip 41 is not easy to be placed between the sample container 1 and the embedding support 3 during assembling, but has a same effect as in Example 1.

Example 3: the embedding assembly for tissue dehydration and location differs from Example 1 in that: the locating strip 41 is a cylinder with a same diameter.

The locating strip 41 has a different shape from that in Example 1, but has a lower requirement to the mould. The obtained locating strip 41 is also flexible, which has a better blocking and locating effects for the biological tissue sample, while maintaining an original shape of the biological tissue sample.

Figure 6:
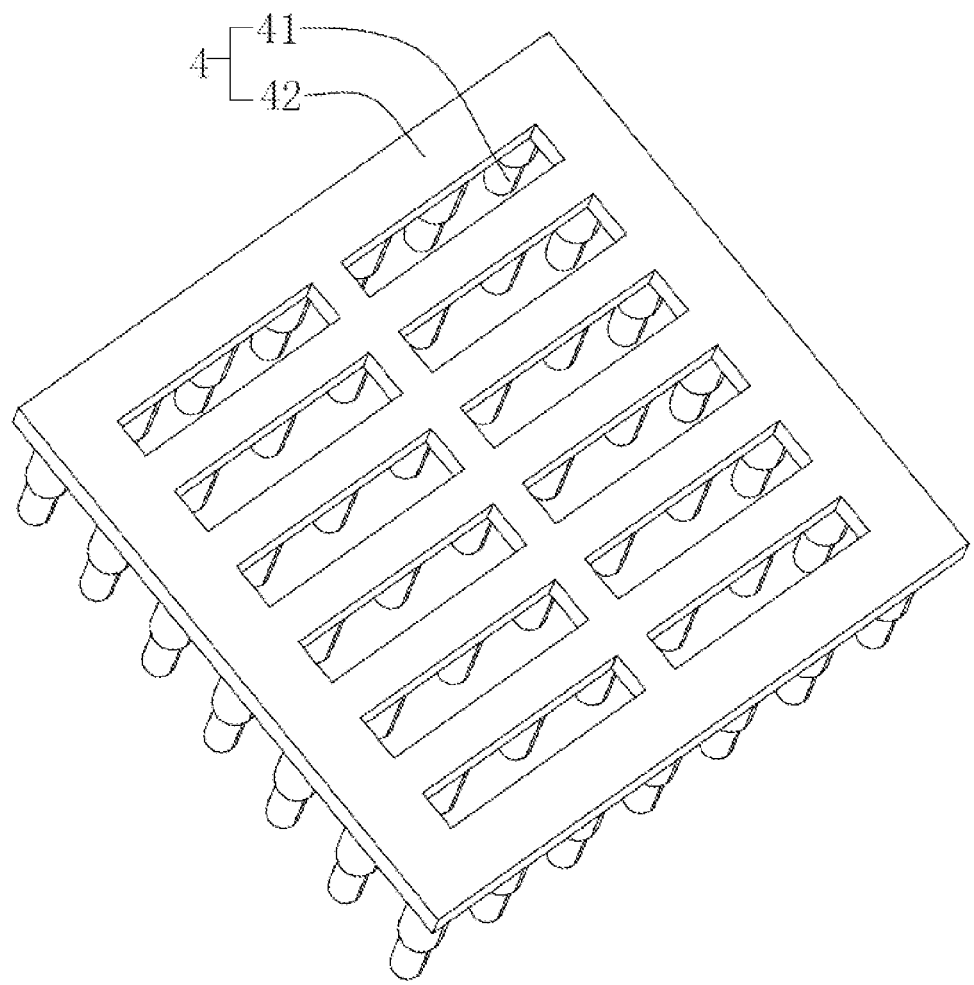
FIG. 6 is a schematic structural view of a locating component in Example 4.

Example 4: the embedding assembly for tissue dehydration and location differs from Example 1 in that: as shown in FIG. 6, the locating component 4 is composed of a carrier 42 and the locating strip 41, the carrier 42 is a sheet with a through-hole, the locating strip 41 is provided at areas of the carrier 42 without the through-holes. The carrier 42 and the locating strip 41 are formed by the injection molding. The locating component 4 is not fixedly connected to the bottom of the embedding support 3 during assembling the embedding assembly for tissue dehydration and location.

Providing the carrier 42 and forming the carrier 42 and the locating strip 41 by the injection molding facilitates production while increasing the stability of the locating strip 41. The locating strip 41 in Example 2 is easier to be placed during assembling the embedding assembly for tissue dehydration and location.

Example 5: the embedding assembly for tissue dehydration and location differs from Example 4 in that: the locating component 4 is composed of the carrier 42 and the locating strip 41, and the carrier 42 is fixedly connected to the bottom of the embedding support 3.

Directly connecting the carrier 42 of the locating component 4 to the embedding support 3 facilitates assembling the embedding assembly for tissue dehydration and location, and provides a stable blocking and locating effect for the biological tissue sample.

Example 6: the embedding assembly for tissue dehydration and location differs from Example 5 in that: the carrier 42 is a frame, the locating strip 41 is provided on the frame, and the locating strip 41 does not cover the through-hole 12 during assembling the embedding assembly for tissue dehydration and location.

The carrier 42 in Example 6 is only a frame-shaped sheet, a number of the locating strip 41 provided on the panel is less than that of the locating strip 41 in Example 5, which however, can still form a circle to encircle and locate the biological tissue sample, and even press an edge of the biological tissue sample, so as to decrease a phenomenon of curving of the sample as much as possible. The carrier 42 with above shape can save the usage of flexible material, so as to decrease the cost.

Example 7: the embedding assembly for tissue dehydration and location differs from Example 5 in that: the carrier 42 is composed of a plurality of panels, and the locating strip 41 and the carrier 42 are integrally formed with each other. The locating strip 41 does not block the through-hole 12 during assembling the embedding assembly for tissue dehydration and location.

The carrier 42 with a plurality of panels can totally connect to the bottom of the embedding support 3, and both the carrier 42 with a plurality of panels and the locating strips 41 do not block the through-holes 12, so that the reagent and the liquid paraffin can be smoothly injected and contact with the biological tissue sample. The mould for obtaining the carrier 42 with a plurality of panels is simpler. Comparing with the shape of the carrier 42 in Example 5, more cost of the flexible material is saved by using the carrier 42 with the plurality of panels in this example. The position of the locating component 4 at the bottom of the embedding assembly can be adjusted to form a specific size or shape, so that the formed locating component 4 can be applicable to the biological tissue sample with different shapes.

Example 8: the embedding assembly for tissue dehydration and location differs from Example 7 in that: the length of the locating strip 41 is four fifths of a distance between the embedding support 3 and the bottom of the sample container 1 when the embedding support 3 is placed in the sample container 1. After the embedding assembly for tissue dehydration and location is assembled, there may be a small gap between an end of the locating strip 41 and the biological tissue sample, or the end head of the locating strip 41 contacts the biological tissue sample, depending on the biological tissue sample to be actually placed.

The locating strips 41 are provided at the above length to leave a certain space for the biological tissue sample to remain its original state as much as possible. The biological tissue sample will not suffer from overturning, curling, straightening, and the like due to the possible gap between the locating strip 41 and the biological tissue sample.

Example 9: the embedding assembly for tissue dehydration and location differs from Example 7 in that: the locating strips 41 is columnar, and the distance between adjacent locating strips 41 is 0.8 mm.

Example 10: the embedding assembly for tissue dehydration and location differs from Example 9 in that: the distance between centers of adjacent locating strips 41 is 1.0 mm.

Example 11: the embedding assembly for tissue dehydration and location differs from Example 7 in that: the locating strips 41 is columnar, and the distance between adjacent locating strips 41 is 1.5 mm.

Example 12: the embedding assembly for tissue dehydration and location differs from Example 11 in that: the distance between centers of adjacent locating strips 41 is 2.4 mm Example 13: the embedding assembly for tissue dehydration and location differs from Example 7 in that: the locating strips 41 is columnar, and the distance between adjacent locating strips 41 is 0.3 mm.

Example 14: the embedding assembly for tissue dehydration and location differs from Example 13 in that: the distance between centers of adjacent locating strips 41 is 0.5 mm In Example 9, Example 11 and Example 13, only the distance at the edges of the adjacent locating strips 41 is defined, that is, the gap of the adjacent locating strips 41 is defined. In Example 10, Example 12 and Example 14, not only the distance at the edges of the adjacent locating strips 41 but also the distance between centers of adjacent locating strips 41 are defined, that is, both the thickness and the gap of adjacent locating strips 41 are defined. Comparing with Example 9, Example 11 and Example 13, it also has blocking and locating effects to the biological tissue sample and saves the cost in Example 10, Example 12 and Example 14.

Example 15: the embedding assembly for tissue dehydration and location differs from Example 7 in that: the flexible material is BOPP.

Example 16: the embedding assembly for tissue dehydration and location differs from Example 7 in that: the flexible material is CPP.

Example 17: the embedding assembly for tissue dehydration and location differs from Example 1 in that: the flexible material is a natural latex.

The frame 31 of the embedding support 3 in all the above examples can be further provided with a plurality of reinforcement columns 36, referring to FIG. 2, which aims to increase a supporting strength of the embedding support 3.

In the above examples in which the locating components 4 is fixedly connected to the embedding support 3, the materials of the locating components 4 are melted at first and then subjected to injected molding. The materials of the locating components 4 has a lower melting point than that of the embedding support 3, therefore, a joint between the embedding support 3 and the locating components 4 is not easy to be melted during the injection molding process.

Comparative Example

Comparative example 1: the embedding assembly for tissue dehydration and location differs from Example 1 is not including the locating component 4.

During the using process, with the injection of the reagent or the liquid paraffin, the biological tissue sample tends to be floated, overturned, curled, and the like.

The above are the preferred embodiments of the present application, which are not intended to limit the protection scope of the present application. Therefore, all equivalent changes made according to the structure, shape and principle of the present application should be covered within the protection scope of the present application.

LIST OF REFERENCE SIGNS

1. Sample Container
11. Placement Area
12. Through-Hole
2. Reagent Container
21. Box Body
22. Extension End
23. Liquid Tank
31. Frame
32. Support Board
33. Connection Board
34. Arc-Shaped Notch
35. Embedding Hole
36. Reinforced Column
4. Locating Component
41. Locating Strip
42. Carrier
5. Locating Area

What is claimed is:

1. An embedding assembly comprising:
a sample container,
a reagent container,
an embedding support, and
a flexible locating component,
wherein the sample container is disposed in the reagent container, an outer wall of the sample container abuts against an inner wall of the reagent container, the embedding support comprises a frame and a support board, the frame and the support board are connected with each other by a connection board, and the frame is disposed on the reagent container above the sample container,
wherein the flexible locating component comprises a plurality of locating strips fixedly connected to a bottom of the embedding support, and
wherein the plurality of locating strips are arranged as an array, and a distance between two adjacent locating strips of the plurality of locating strips in a same row or a same column of the array is 0.3-1.5 mm.

2. The embedding assembly according to claim 1, wherein the flexible locating component further comprises a carrier fixedly connected to the plurality of locating strips, and the carrier is fixedly connected to the bottom of the embedding support.

3. The embedding assembly according to claim 1, wherein a length of each of the plurality of locating strips is not greater than a distance between the bottom of the embedding support and a bottom of the sample container.

4. The embedding assembly according to claim 1, wherein each of the plurality of locating strips are made of a flexible material, the flexible material is at least one selected from a group consisting of liquid silicone, flexible plastic and latex, and each of the plurality of locating strips has a Shore hardness of 5-60 HA.

* * * * *